(12) United States Patent
Zehri (10) Patent No.: US 10,536,381 B2
(45) Date of Patent: *Jan. 14, 2020

(54) DETERMINING CONNECTIONS OF A NETWORK BETWEEN SOURCE AND TARGET NODES IN A DATABASE

(71) Applicant: International Business Machines Corporation, Armonk, NY (US)

(72) Inventor: Joseph S. Zehri, Sugar Land, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/413,720

(22) Filed: May 16, 2019

(65) Prior Publication Data

US 2019/0273687 A1    Sep. 5, 2019

Related U.S. Application Data

(63) Continuation of application No. 14/808,306, filed on Jul. 24, 2015, now Pat. No. 10,389,640.

(51) Int. Cl.
*H04L 12/801* (2013.01)
*H04L 12/705* (2013.01)
(Continued)

(52) U.S. Cl.
CPC ............ *H04L 47/17* (2013.01); *G06F 16/284* (2019.01); *G06F 16/9024* (2019.01);
(Continued)

(58) Field of Classification Search
CPC ... H04L 47/781; H04L 41/0813; H04L 67/34; G06F 16/9566; G06F 16/9558; G06F 9/44505
See application file for complete search history.

(56) References Cited

U.S. PATENT DOCUMENTS 8,412,660 B2    4/2013    Yanagisawa
8,667,012 B2    3/2014    Fuchs et al.
(Continued)

OTHER PUBLICATIONS

Newman et al., "Finding and Evaluating Community Structure in Networks," Physical Review E 69, No. 2, 2004, 16 pages.
(Continued)

*Primary Examiner* — Chris Parry
*Assistant Examiner* — Caroline H Jahnige
(74) *Attorney, Agent, or Firm* — Anthony V. England; SVL IP Law Edell, Shapiro & Finnan, LLC (57) ABSTRACT

In an embodiment of the invention, a system determines connections between source and target nodes in a network by determining edges with common nodes between the source and target nodes within the network for each of one or more hops. Each determined edge links a pair of nodes in a network path between the source and target nodes. The system removes certain edges from the determined edges to produce a resulting set of edges. In particular, each removed edge is an edge that includes a node within a loop in the network or is an edge that is unconnected to another edge. The system determines connections between the source and target nodes based on the resulting set of edges. Embodiments of the present invention further include a method and computer program product for determining connections between source and target nodes in a network in substantially the same manners described above.

20 Claims, 2 Drawing Sheets

(51) Int. Cl.
*G06F 16/28* (2019.01)
*H04L 29/08* (2006.01)
*G06F 16/901* (2019.01)
*H04L 29/14* (2006.01)
*H04L 12/24* (2006.01)
*G06F 16/25* (2019.01)

(52) U.S. Cl.
CPC .......... *H04L 45/18* (2013.01); *H04L 67/1097* (2013.01); *G06F 16/25* (2019.01); *H04L 41/024* (2013.01); *H04L 69/40* (2013.01)

(56) References Cited

U.S. PATENT DOCUMENTS

| | | | |
|---|---|---|---|
| 2004/0073702 | A1 | 4/2004 | Rong |
| 2005/0114551 | A1 | 5/2005 | Basu et al. |
| 2007/0208693 | A1 | 9/2007 | Chang |
| 2008/0178137 | A1 | 7/2008 | Papadopoulou et al. |
| 2009/0125852 | A1 | 5/2009 | Papadopoulou |
| 2012/0250535 | A1 | 10/2012 | Delling et al. |
| 2012/0317121 | A1 | 12/2012 | Fuchs |
| 2013/0155068 | A1 | 6/2013 | Bier |
| 2013/0308444 | A1 | 11/2013 | Sem-Jacobsen et al. |
| 2013/0339352 | A1 | 12/2013 | Jin et al. |
| 2015/0142796 | A1 | 5/2015 | Floreskul |
| 2015/0302063 | A1* | 10/2015 | Nigam ................ G06F 16/2471 707/770 |
| 2016/0112327 | A1 | 4/2016 | Morris |
| 2017/0026260 | A1 | 1/2017 | Zehri |
| 2017/0026261 | A1 | 1/2017 | Zehri |
| 2017/0026271 | A1 | 1/2017 | Luke et al. |
| 2017/0026272 | A1 | 1/2017 | Luke et al. |

OTHER PUBLICATIONS

Cao et al., "Atlas: Approximating Shortest Paths in Social Graphs," Tech. rep. Sep. 2011, Department of Computer Science, University of California, Santa Barbara, 2011, 20 pages.

Ivan Stojmenovic et al, Toward scalable cut vertex and link detection with applications in wireless ad hoc networks, Network, IEEE, vol. 25, issue 1 ISSN: 0890-8044 Publication Year: 2011, pp. 44-48 Sponsored by: IEEE communications society.

"Yen's algorithm", Wikipedia, Aug. 11, 2014, 8 pages.

"K shortest path routing", Wikipedia, Jul. 9, 2014, 5 pages.

"Dijkstra's algorithm", Wikipedia, Dec. 9, 2014, 17 pages.

"Biconnected component", Wikipedia, Dec. 4, 2014, 6 pages.

Reingold et al., "Combinatorial Algorithms: Theory and Practice", 1977 Book, Section 8.2.3 Biconnectivity, 3 pages.

V. Adamchik, Algorithm Design and Analysis, Lecture notes, Feb. 2014, 6 pages.

A. Mehta et al., Time-Constrained Flooding, Lecture note, John Hopkins University, May 2015, 32 pages.

List of IBM Patents or Patent Applications Treated as Related, May 2019, 2 pages.

\* cited by examiner

FIG. 2

DETERMINING CONNECTIONS OF A NETWORK BETWEEN SOURCE AND TARGET NODES IN A DATABASE

BACKGROUND

Present invention embodiments relate to determining connections between a source node and a target node of a network, and more specifically, to a manner of determining connections between network nodes that may be performed within a database.

Networks of connections among individuals and/or objects (places, communications devices, etc.) may be stored in a relational database (e.g., DB2, Oracle) or unstructured database (e.g., Hadoop). Network analysts (e.g., in a law enforcement investigation) may seek to determine if information can be passed between two individuals in the network.

SUMMARY

According to one embodiment of the present invention, a system determines connections between source and target nodes in a network by determining edges with common nodes between the source and target nodes within the network for each of one or more hops. Each determined edge links a pair of nodes in a network path between the source and target nodes. The system removes certain edges from the determined edges to produce a resulting set of edges. In particular, each removed edge is an edge that includes a node within a loop in the network or is an edge that is unconnected to another edge. The system determines connections between the source and target nodes based on the resulting set of edges. Embodiments of the present invention further include a method and computer program product for determining connections between source and target nodes in a network in substantially the same manners described above.

BRIEF DESCRIPTION OF THE DRAWINGS

Generally, like reference numerals in the various figures designate like components.

DETAILED DESCRIPTION

Present invention embodiments determine connections between a source node and a target node within a network. All shortest paths between the source and target may be determined. Alternatively, all paths between the source and target up to a specified hop limit may be determined. Conventional shortest path algorithms generally do not find all shortest paths between a source and target and may be inefficient for large networks when the data must be extracted from the database for processing. When paths between the source node and target node include more hops than the shortest paths, the number of edges grows exponentially and determining simple paths without loops becomes challenging. Present invention embodiments accommodate this situation and identify the simple paths without loops. A network comprising a source node and target node that is to be analyzed to determine connections between the source and target nodes is sometimes referred to herein as a "subject network."

One aspect of a present invention embodiment is to determine connections in an environment that requires accessing data representing a large network (e.g., over 100 Terabytes of data) with a topography stored in relational database tables (residing on hard disk storage) and preferably with directed edges. An embodiment of the present invention may be implemented within a relational database (e.g., using a stored procedure with Stored Procedure Language (SPL) and/or Structured Query Language (SQL) statements) and may provide for limiting the range of dates or times associated with connections in the network, requesting paths of up to a specified number of hops, requesting all the shortest paths, examining the edges in both directions, and returning information about paths cleansed loops. In general, an embodiment performs a bi-directional zigzag expand to facilitate concluding the analysis after reaching a specified hop limit or, optionally, after processing shortest paths between the source and target.

Figure 1:
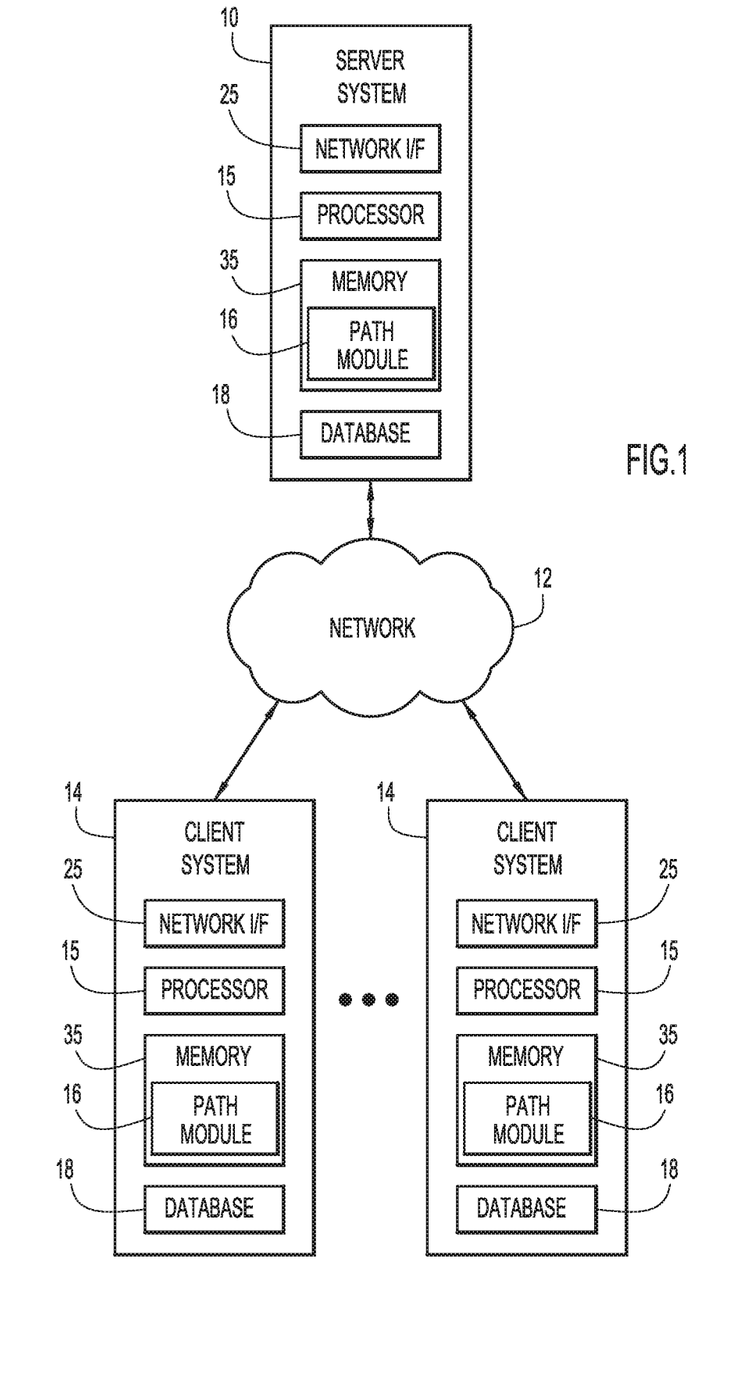
FIG. 1 is a diagrammatic illustration of an example environment for an embodiment of the present invention.

An example environment for use with present invention embodiments is illustrated in FIG. 1. Specifically, the environment includes one or more server systems 10, and one or more client or end-user systems 14. Server systems 10 and client systems 14 may be remote from each other and communicate over a network 12 (not typically a subject network). Network 12 may be implemented by any number of any suitable communications media (e.g., wide area network (WAN), local area network (LAN), Internet, intranet, etc.). Alternatively, server systems 10 and client systems 14 may be local to each other, and communicate via any appropriate local communication medium (e.g., local area network (LAN), hardwire, wireless link, intranet, etc.).

Client systems 14 enable users to communicate with server system 10 (e.g., via network 12) to analyze a subject network. The server systems include a path module 16 to determine connections within one or more subject networks. A database system 18 may store information for the analysis (e.g. information representing a subject network, temporary data for determining connections between a particular source node and target node of a subject network, etc.). The database system may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to a desired analysis of a subject network, and may provide reports including analysis results (e.g., information about connections between a specified source node and target node, etc.).

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., database management (DBMS) software, server/communications software, etc.).

Alternatively, one or more client systems 14 may analyze data describing a subject network when operating as a stand-alone unit. In a stand-alone mode of operation, the client system stores or has access to the data (e.g. node data, edge data, etc.), and includes path module 16 to determine connections between a source node and a target node. The graphical user (e.g., GUI, etc.) or other interface (e.g., command line prompts, menu screens, etc.) solicits information from a corresponding user pertaining to the desired connections and analysis, and may provide reports including analysis results.

Path module 16 may include one or more modules or units to perform the various functions of present invention embodiments described below. The various modules may be implemented by any combination of any quantity of software and/or hardware modules or units, and may reside within memory 35 of the server and/or client systems for execution by processor 15.

According to an example embodiment of the present invention, database 18 is a relational database in which a subject network is represented by tables including a node table and an edge table, and path module 16 is implemented as a stored procedure (e.g., using SPL and SQL). The node table includes a node identifier column with type BIGINT. The edge table has rows representing direct connections from one node to another. The edge table includes columns for the identifier of the node each edge leads from and the identifier of the node the edge leads to. In addition, the edge table may include other columns (e.g., a timestamp associated with the edge, a date associated with the edge, an edge type, an identifier of the edge, a type of the node the edge leads from (e.g., a person, a phone, an email address, etc.), a type of the node the edge leads to, etc.).

The stored procedure may be called with parameters including the identifier of the source node, the identifier of the target node, a start date for edges, an end date for edges, and a hop limit. The hop limit parameter may have a value (e.g., an integer between one and eight) indicating that all paths up to that hop length are to be considered in determining connections between the source and target nodes. Alternatively, the hop limit parameter may have a value (e.g., a value less than one, and preferably zero) indicating a request for early exit: i.e., that the analysis should conclude after considering the shortest paths between the source and target. Intermediate data of the analysis may be stored in hashed global temp tables for each hop to maximize the size limit for the amount of data stored for each hop and to enhance the performance of the stored procedure.

If an edge is consistent with the received control parameters (or other restrictions), the edge is considered a qualified edge. For example, if an edge start date and/or end date is specified in the parameters passed to the stored procedure, an edge is considered qualified if its associated date or timestamp falls within the range defined by the specified start/end date(s).

Figure 2:
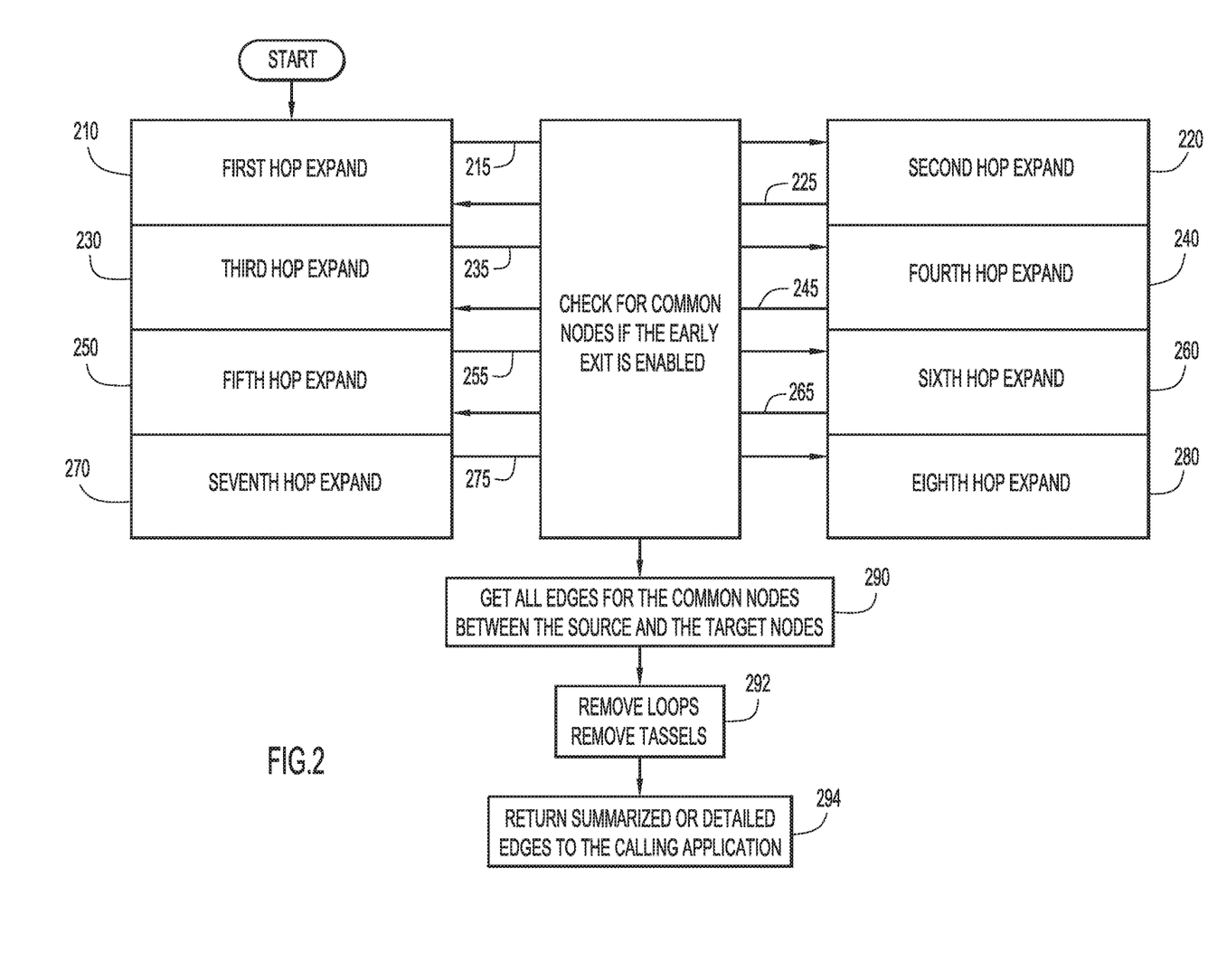
FIG. 2 is a flow diagram illustrating an example manner of determining connections between a source node and a target node of a network according to an embodiment of the present invention.

An example manner of determining connections between a source node and a target node of a subject network (e.g., via path module 16 and processor 15) according to an embodiment of the present invention is illustrated in FIG. 2. Initially, path module 16 receives control parameters for the analysis including, e.g., the source node identifier, target node identifier, edge start date, edge end date, hop limit and/or the like.

At step 210, path module 16 finds one-hop paths from the source node. For example, path module 16 may find all qualified edges of the network graph leading from or to the source node. From these edges, path module 16 may form a set, PS1, of paths from the source node with a length of one hop. Each path in set PS1 may be represented by information comprising an identifier of the first node of the path (the source node) and an identifier of the second node of the path (i.e., the node the qualified edge connects the source to). In addition, path module 16 may form a set, NS, of the distinct nodes appearing in the paths of set PS1.

At step 215, path module 16 determines whether to expand the search by another hop. If the hop limit has been set to one, processing proceeds to step 290. Likewise, if early exit has been requested, and a path connecting the source to the target has been found, processing proceeds to step 290. Otherwise, processing proceeds to step 220. To determine if a path connecting the source to the target has been found, path module 16 may determine whether the target node is present in the set of nodes, NS; if so, a connecting path has been found.

At step 220, path module 16 finds one-hop paths from the target node. For example, path module 16 may find all qualified edges of the network graph leading from or to the target node. From these edges, path module 16 may form a set, PT1, of paths from the target node with a length of one hop. Each path in set PT1 may be represented by information comprising an identifier of the first node of the path (the target node) and an identifier of the second node of the path (i.e., the node the qualified edge connects the target to). In addition, path module 16 may form a set, NT, of the distinct nodes appearing in the paths of set PT1.

At step 225, path module 16 determines whether to expand the search by another hop. If the hop limit has been set to two, processing proceeds to step 290. Likewise, if early exit has been requested, and a path connecting the source to the target has been found, processing proceeds to step 290. Otherwise, processing proceeds to step 230. To determine if a path connecting the source to the target has been found, path module 16 may form the intersection, NI, of the sets NS and NT. If the intersection is empty, no connecting path has yet been found.

At step 230, path module 16 finds two-hop paths from the source node. Initially, path module 16 may determine the distinct set of nodes appearing in the one-hop paths of set PS1, excluding the source node and target node. These nodes may be used as expansion-points for the current step. For example, path module 16 may find all qualified edges of the network graph leading from or to an expansion-point node. From these edges, path module 16 may form a set, PS2, of paths from the source node with a length of two hops. Each path in set PS2 may be represented by information comprising identifiers of the path's first node (the source node), second node (the expansion-point node), and third node (the node the qualified edge connects the expansion-point node to). In addition, path module 16 may add to the set NS each node that appears in a path of the set PS2 and is not already present in the set NS.

At step 235, path module 16 determines whether to expand the search by another hop. If the hop limit has been set to three, processing proceeds to step 290. Likewise, if early exit has been requested, and a path connecting the source to the target has been found, processing proceeds to step 290. Otherwise, processing proceeds to step 240. To determine if a path connecting the source to the target has been found, path module 16 may update the intersection, NI, of sets NS and NT. If the intersection is empty, no connecting path has yet been found.

At step 240, path module 16 finds two-hop paths from the target node. Initially, path module 16 may determine the distinct set of nodes appearing in the one-hop paths of set PT1, excluding the source node and target node. These nodes may be used as expansion-points for the current step. For example, path module 16 may find all qualified edges of the network graph leading from or to an expansion-point node. From these edges, path module 16 may form a set, PT2, of paths from the target node with a length of two hops. Each path in set PT2 may be represented by information comprising identifiers of the path's first node (the target node), second node (the expansion-point node), and third node (the node the qualified edge connects the expansion-point node to). In addition, path module 16 may add to the set NT each node that appears in a path of the set PT2 and is not already present in the set NT.

At step 245, path module 16 determines whether to expand the search by another hop. If the hop limit has been set to four, processing proceeds to step 290. Likewise, if early exit has been requested, and a path connecting the source to the target has been found (e.g., as described with respect to step 235), processing proceeds to step 290. Otherwise, processing proceeds to step 250.

At step 250, path module 16 finds three-hop paths from the source node. Initially, path module 16 may determine the distinct set of nodes appearing as the third node in the two-hop paths of set PS2, excluding the source node and target node. These nodes may be used as expansion-points for the current step. For example, path module 16 may find all qualified edges of the network graph leading from or to an expansion-point node. From these edges, path module 16 may form a set, PS3, of paths from the source node with a length of three hops by combining each two-hop path of set PS2 with each qualified edge that connects to the third node of the two-hop path. Each path in set PS3 may be represented by information comprising identifiers of the first, second, third, and fourth nodes of the path. The first, second, and third nodes correspond to a two-hop path of set PS2, and the fourth node is connected to the third node by a qualified edge. In addition, path module 16 may add to set NS each node that appears in a path of set PS3 and is not already present in set NS.

At step 255, path module 16 determines whether to expand the search by another hop. If the hop limit has been set to five, processing proceeds to step 290. Likewise, if early exit has been requested, and a path connecting the source to the target has been found (e.g., as described with respect to step 235), processing proceeds to step 290. Otherwise, processing proceeds to step 260.

At step 260, path module 16 finds three-hop paths from the target node. Initially, path module 16 may determine the distinct set of nodes appearing as the third node in the two-hop paths of set PT2, excluding the source node and target node. These nodes may be used as expansion-points for the current step. For example, path module 16 may find all qualified edges of the network graph leading from or to an expansion-point node. From these edges, path module 16 may form a set, PT3, of paths from the target node with a length of three hops by combining each two-hop path of set PT2 with each qualified edge that connects to the third node of the two-hop path. Each path in set PT3 may be represented by information comprising identifiers of the first, second, third, and fourth nodes of the path. The first, second, and third nodes correspond to a two-hop path of set PT2, and the fourth node is connected to the third node by a qualified edge. In addition, path module 16 may add to set NT each node that appears in a path of set PT3 and is not already present in set NT.

At step 265, path module 16 determines whether to expand the search by another hop. If the hop limit has been set to six, processing proceeds to step 290. Likewise, if early exit has been requested, and a path connecting the source to the target has been found (e.g., as described with respect to step 235), processing proceeds to step 290. Otherwise, processing proceeds to step 270.

At step 270, path module 16 finds edges for four-hop paths from the source node. Initially, path module 16 may determine the set of distinct nodes that appear as the fourth node in three-hop paths of set PS3, excluding the source node and target node. Path module 16 may then determine a set, ES4, of distinct qualified edges connecting to those nodes. The members of set ES4 are the edges for the fourth hops of four-hop paths from the source node. Each member of set ES4 may be represented by information comprising an identifier of the node it leads from (the fourth node in a path of set PS3) and an identifier of the node it leads to (the edge's other node). In addition, path module 16 may add to set NS each node that appears in an edge of set ES4 and is not already present in set NS.

At step 275, path module 16 determines whether to expand the search by another hop. If the hop limit has been set to seven, processing proceeds to step 290. Likewise, if early exit has been requested, and a path connecting the source to the target has been found (e.g., as described with respect to step 235), processing proceeds to step 290. Otherwise, processing proceeds to step 280.

At step 280, path module 16 finds edges for four-hop paths from the target node. Initially, path module 16 may determine the set of distinct nodes that appear as the fourth node in three-hop paths of set PT3, excluding the source node and target node. Path module 16 may then determine a set, ET4, of distinct qualified edges connecting to those nodes. The members of set ET4 are the edges for the fourth hops of four-hop paths from the target node. Each member of set ET4 may be represented by information comprising an identifier of the node it leads from (the fourth node in a path of set PT3) and an identifier of the node it leads to (the edge's other node). In addition, path module 16 may add to set NT each node that appears in an edge of set ET4 and is not already present in set NT.

At step 290, path module 16 collects the set EST of distinct edges for paths connecting the source node and target node. To determine paths connecting the source and target nodes, path module 16 initially forms (or updates) the intersection, NI, of sets NS and NT. The nodes in intersection NI are connected to both the source and the target. To determine four-hop paths from the source that will connect to the target, path module 16 collects edges in set ES4 that lead to a node in intersection NI and forms each distinct combination of those edges with three-hop paths of set PS3 to which they connect. Likewise, to determine four-hop paths from the target that will connect to the source, path module 16 collects edges in set ET4 that lead to a node in intersection NI and forms each distinct combination of those edges with three-hop paths of set PT3 to which they connect. Distinct edges of the connecting four-hop paths are added to set EST. To determine one, two, and three hop paths from the source/target that will connect with the target/source, path module 16 selects each path in sets PS1, PS2, PS3, PT1, PT2, or PT3 for which the last node of the path is present in intersection NI. Distinct edges of the connecting one, two, and three-hop paths are added to set EST.

At step 292, path module 16 forms a subset (EST') of set EST containing edges that appear in at least one simple path between the source and target. For example, path module 16 may form a list (the loop-node-list) of all nodes in set EST that are part of a loop or bi-connected components, and another list (the good-node-list) of the nodes that are not part of a loop. A loop-node is a node used twice to complete a path between the source node and the target node. A good-node is a node that appears once in a path between the source node and the target node. Path module 16 then excludes the edges that contain a node in the loop-nodes-list and not in the good-nodes-list. In addition, path module 16 removes tassels (edges that do not connect to another edge in the set). In a relational database environment where the edges of set EST are stored in a table, path module 16 may form the subset EST' by making a list of edges to be removed and selecting edges from set EST absent from the list into a new table. This avoids incurring the overhead of deleting rows from a table.

At step 294, path module 16 returns information about the edges in subset EST'. This information may be returned to the calling application in any form. For example, path module 16 may return summarized edge information in the form of a single row for each edge, representing all the edge dimensions (e.g., date, time, type, etc.). Alternatively, path module 16 may return more detailed edge information including each instance of the edge (e.g., each date, time, and type) that appears in a simple path between the source and target within the requested date range.

Present invention embodiments provide several advantages with respect to computer functionality including data access. For example, present invention embodiments provide instant access to existing large relational database tables (e.g., call detail record (CDR) or other tables up to and in excess of 100 Terabytes). These tables may be used for various reports. Since the data (in database tables) is stored on disks (or other secondary storage), primary memory requirements (e.g., RAM, etc.) are reduced. Further, the in-memory data (e.g., data in the primary memory) need not be reloaded after a system failure, thereby providing rapid recovery with reduced processing time. Any portion of the records (e.g., specific date range, etc.) or all of the existing records may be accessed. Since directed edges do not need to be reversed, processing time is enhanced when finding the paths.

Current or up-to-date data may be accessed, where existing database procedures may be utilized during path identification to concurrently insert new data or modify existing data in the database tables (e.g., as network topology changes) (without the need for new procedures). The techniques of present invention embodiments may be maintained and accessed from any application with SQL support.

It will be appreciated that the embodiments described above and illustrated in the drawings represent only a few of the many ways of implementing embodiments for determining connections between a source node and a target node of a network.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, database software, communications software, etc.). These systems may include any types of monitors and input devices (e.g., keyboard, mouse, voice recognition, touch screen, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments may be utilized for determining connections between source and target nodes in any network (e.g., communication or data networks, social or other networks with connections (or relationships) between entities, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of determining connections between a source node and a target node in a network comprising:
   repeatedly determining edges with common in a network path between the source node and the target node for a predetermined number of hops, the predetermined number of hops being initially set to one hop and iteratively increased until a path connecting the source node to the target node is discovered while an early exit is requested;
   producing a resulting set of edges by removing each edge including a node within a loop in the network and each edge that is unconnected to another edge; and
   determining connections between the source node and the target node based on the resulting set of edges, wherein:
   while the early exit is requested, the determining of connections determines only paths connecting the source node and the target node that have the predetermined number of hops,
   when the early exit is not requested, the determining of connections determines all paths connecting the source node and the target node that have a number of hops that is less than or equal to a hop limit, and
   the early exit is indicated as being requested when a hop limit parameter is set to a value less than one, the hop limit parameter indicating a value for the hop limit when the hop limit parameter is set to a value that is not less than one.

2. The computer-implemented method of claim 1, wherein the repeatedly determining edges further comprises:
   determining edges with common nodes between the source node and the target node within the network and including a desired date range for a connection.

3. The computer-implemented method of claim 1, wherein a topography of the network for determining the connections is stored in a relational database residing on hard disk storage and accessed by one or more SQL statements.

4. The computer-implemented method of claim 1, wherein the network includes a social network, and the connections between the source node and the target node represent relationships between entities within the social network.

5. The computer-implemented method of claim 1, wherein the repeatedly determining edges further comprises:
   finding all qualified edges forming a path from the source node and having the predetermined number of hops;
   when one of a first additional condition and a second additional condition is satisfied, the first additional condition being an indication that the early exit is not requested and the predetermined number of hops is not equal to the hop limit, and the second additional condition being the indication that the early exit is requested and no discovery of a path connecting the source node to the target node, then performing:
   finding all qualified edges forming a path from the target node and having the predetermined number of hops.

6. The computer-implemented method of claim 1, wherein the determining connections further comprises:
   determining second common nodes included in respective first paths from the source node formed by first edges from the resulting set of edges and included in respective second paths from the target node formed by second edges from the resulting set of edges.

7. The computer-implemented method of claim 1, further comprising:
   forming a set of edges that appear in at least one simple path between the source node and the target node; and
   storing the set of edges in a table of a relational database environment, wherein
   the producing the resulting set of edges further comprises:
   creating a list of edges to be removed, and
   selecting edges from the set of edges that are absent from the list of edges to be removed, the selected edges being selected into a new table of the resulting set of edges.

8. A system of determining connections between a source node and a target node in a network comprising:
   at least one memory including a module to determine connections between the source node and the target node; and
   at least one processor, the system being configured to:
   repeatedly determine edges with common nodes in a network path between the source node and the target node for a predetermined number of hops, the predetermined number of hops being initially set to one hop and iteratively increased until a path connecting the source node to the target node is discovered while an early exit is requested;

produce a resulting set of edges by removing each edge including a node within a loop in the network and each edge that is unconnected to another edge; and determine connections between the source node and the target node based on the resulting set of edges, wherein:

while the early exit is requested, the determining of connections determines only paths connecting the source node and the target node that have the predetermined number of hops, when the early exit is not requested, the determining of connections determines all paths connecting the source node and the target node that have a number of hops that is less than or equal to a hop limit, and the early exit is indicated as being requested when a hop limit parameter is set to a value less than one, the hop limit parameter indicating a value for the hop limit when the hop limit parameter is set to a value that is not less than one.

9. The system of claim 8, wherein the determining edges further comprises:

determining edges with common nodes between the source node and the target node within the network and including a desired date range for a connection.

10. The system of claim 8, wherein a topography of the network for determining the connections is stored in a relational database residing on hard disk storage and accessed by one or more SQL statements.

11. The system of claim 8, wherein the network includes a social network, and the connections between the source node and the target node represent relationships between entities within the social network.

12. The system of claim 8, wherein the system being configured to repeatedly determine edges further comprises the system being configured to:

find all qualified edges forming a path from the source node and having the predetermined number of hops;

when one of a first additional condition and a second additional condition is satisfied, the first additional condition being an indication that the early exit is not requested and the predetermined number of hops being not equal to the hop limit, and the second additional condition being the indication that the early exit is requested and no discovery of a path connecting the source node to the target node, then:

find all qualified edges forming a path from the target node and having the predetermined number of hops.

13. The system of claim 8, wherein the determining connections further comprises:

determining second common nodes included in respective first paths from the source node formed by first edges from the resulting set of edges and included in respective second paths from the target node formed by second edges from the resulting set of edges.

14. The system of claim 8, wherein the system is further configured to:

form a set of edges that appear in at least one simple path between the source node and the target node; and store the set of edges in a table of a relational database environment, wherein the system being configured to produce the resulting set of edges further comprises the system being configured to:

create a list of edges to be removed, and select edges from the resulting set of edges that are absent from the list of edges to be removed, the selected edges being selected into a new table of the resulting set of edges.

15. A computer program product for determining connections between a source node and a target node in a network comprising:

a computer readable storage medium having program instructions embodied therewith, the program instructions executable by a processor to cause the processor to:

repeatedly determine edges with common nodes in a network path between the source node and the target node for a predetermined number of hops, the predetermined number of hops being initially set to one hop and iteratively increased until a path connecting the source node to the target node is discovered while an early exit is requested;

produce a resulting set of edges by removing each edge including a node within a loop in the network and each edge that is unconnected to another edge; and determine connections between the source node and the target node based on the resulting set of edges, wherein:

while the early exit is requested, the determining of connections determines only paths connecting the source node and the target node that have the predetermined number of hops, when the early exit is not requested, the determining of connections determines all paths connecting the source node and the target node that have a number of hops that is less than or equal to a hop limit, and the early exit is indicated as being requested when a hop limit parameter is set to a value less than one, the hop limit parameter indicating a value for the hop limit when the hop limit parameter is set to a value that is not less than one.

16. The computer program product of claim 15, wherein the repeatedly determining edges further comprises:

determining edges with the common in the network path between the source node and the target node and including a desired date range for a connection.

17. The computer program product of claim 15, wherein the network includes a social network, and the connections between the source node and the target node represent relationships between entities within the social network.

18. The computer program product of claim 15, wherein the repeatedly determining edges further comprises:

finding all qualified edges forming a path from the source node and having the predetermined number of hops;

when one of a first additional condition and a second additional condition is satisfied, the first additional condition being an indication that the early exit is not requested and the predetermined number of hops being not equal to the hop limit, and the second additional condition being the indication that the early exit is requested and no discovery of a path connecting the source node to the target node, then performing:

finding all qualified edges forming a path from the target node and having the predetermined number of hops.

19. The computer program product of claim 15, wherein the determining connections further comprises:

determining second common nodes included in respective first paths from the source node formed by first edges from the resulting set of edges and included in respective second paths from the target node formed by second edges from the resulting set of edges.

20. The computer program product of claim 15, wherein the program instructions are further executable by the processor to cause the processor to:
   form a set of edges that appear in at least one simple path between the source node and the target node; and
   store the set of edges in a table of a relational database environment, wherein
   the producing the resulting set of edges further comprises:
      creating a list of edges to be removed, and
      selecting edges from the set of edges that are absent from the list of edges to be removed, the selected edges being selected into a new table of the resulting set of edges.

\* \* \* \* \*